United States Patent
Karri et al.

(10) Patent No.: US 11,704,233 B2
(45) Date of Patent: Jul. 18, 2023

(54) SHIFT LEFT MODEL EXECUTION IN SOFTWARE DELIVERY

(71) Applicant: International Business Machines Corporation, Armonk, NY (US)

(72) Inventors: Venkata Vara Prasad Karri, Visakhapatnam (IN); Saraswathi Sailaja Perumalla, Visakhapatnam (IN); Sarbajit K. Rakshit, Kolkata (IN); Sampath Kumar Pulupula Venkata, Visakhapatnam (IN); Ravi Sankar Parvathina, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/532,179

(22) Filed: Nov. 22, 2021

(65) Prior Publication Data
US 2023/0161692 A1 May 25, 2023

(51) Int. Cl.
*G06F 11/36* (2006.01)
*G06F 11/07* (2006.01)
*G06F 8/60* (2018.01)

(52) U.S. Cl.
CPC ............ *G06F 11/3688* (2013.01); *G06F 8/60* (2013.01); *G06F 11/079* (2013.01); *G06F 11/0721* (2013.01)

(58) Field of Classification Search
CPC ............ G06F 11/3688; G06F 11/0721; G06F 11/079; G06F 8/60
USPC .................................. 717/101–132, 168–174
See application file for complete search history.

(56) References Cited

U.S. PATENT DOCUMENTS

| 5,499,371 A | * | 3/1996 | Henninger | G06F 8/24 707/999.102 |
| 6,681,383 B1 | * | 1/2004 | Pastor | G06F 8/30 717/126 |
| 8,151,248 B1 | * | 4/2012 | Butler | G06F 11/368 717/124 |
| 8,418,000 B1 | * | 4/2013 | Salame | G06F 11/3692 714/26 |
| 8,881,095 B1 | * | 11/2014 | Hunt, Jr. | G06F 11/3688 705/7.17 |
| 9,311,670 B2 | * | 4/2016 | Hoffberg | H04W 4/029 |

(Continued)

OTHER PUBLICATIONS

Gonzalez et al., Barriers to Shift-Left Security: The Unique Pain Points of Writing Automated Tests Involving Security Controls, ACM, pp. 1-12 (Year: 2021).*
Buckley, et al, Software Quality Assurance, IEEE, pp. 36-41 (Year: 1984).*
Wangoo et al, "Artificial Intelligence Techniques in Software Engineering for Automated Software Reuse and Design", IEEE, pp. 1-4 (Year: 2018).*

(Continued)

*Primary Examiner* — Anil Khatri
(74) *Attorney, Agent, or Firm* — Jared L. Montanaro

(57) ABSTRACT

Disclosed herein a system, method, and computer program product for providing proactive guidance to users in order to execute a shift left model in software delivery. As disclosed, a processor may receive an issue resolution request. The processor may further access an issue resolution request repository where the issue resolution request repository may include details related to prior issue resolution requests. The processor may subsequently classify the issue resolution request based on the details related to the prior issue resolution requests. Accordingly, the processor may identify a root cause for the issue resolution request.

17 Claims, 6 Drawing Sheets

(56) References Cited

U.S. PATENT DOCUMENTS

| | | | |
|---|---|---|---|
| 9,535,902 B1* | 1/2017 | Michalak | G06F 16/3331 |
| 9,940,104 B2* | 4/2018 | Vann | G06F 8/36 |
| 10,162,740 B1* | 12/2018 | Setty | G06F 9/44505 |
| 10,235,269 B2 | 3/2019 | Bassin | |
| 10,452,521 B2 | 10/2019 | Kaulgud | |
| 10,789,229 B2* | 9/2020 | He | G06F 16/285 |
| 10,929,268 B2 | 2/2021 | Bhat | |
| 10,949,338 B1* | 3/2021 | Sirianni | G06F 17/18 |
| 11,481,211 B1* | 10/2022 | Karri | G06F 8/10 |
| 11,561,849 B1* | 1/2023 | Kairali | G06F 9/547 |
| 11,562,135 B2* | 1/2023 | Galitsky | G06F 16/3329 |
| 11,620,582 B2* | 4/2023 | Chen | G06N 20/20 |
| | | | 706/12 |
| 2020/0110696 A1 | 4/2020 | Liegard | |
| 2021/0287108 A1* | 9/2021 | Hwang | G06N 5/04 |

OTHER PUBLICATIONS

Khanna et al, "Artificial Intelligence based Risk Management Framework for Distributed Agile Software Development", IEEE, pp. 657-660 (Year: 2021).*

Hourani et al, "The Impact of Artificial Intelligence on Software Testing", IEEE, 565-570 (Year: 2019).*

Qi et al., "Towards Semantic Knowledge Propagation from Text Corpus to Web Images", ACM, pp. 297-306 (Year: 2011).*

Joe the IT Guy. "5 Tips for Shift-Left Success on the IT Service Desk." Published Jun. 13, 2018 by Joe the IT Guy. 9 pages, https://www.joetheitguy.com/5-tips-for-shift-left-success-on-the-it-service-desk/.

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

SHIFT LEFT MODEL EXECUTION IN SOFTWARE DELIVERY

BACKGROUND

The present disclosure relates generally to the field of application management and support (AMS), and more specifically to providing proactive guidance to users in order to execute a shift left model in software delivery.

Shift left is a practice intended to find and prevent defects early in the software delivery process. The idea is to improve quality by moving tasks to the left as early as possible in the lifecycle. Shift left testing means testing earlier in the software development process.

SUMMARY

Embodiments of the present disclosure include a method, computer program product, and system for providing proactive guidance to users in order to execute a shift left model in software delivery. A processor may receive an issue resolution request. The processor may access an issue resolution request repository. The issue resolution request repository may include details related to prior issue resolution requests. The processor may classify the issue resolution request based on the details related to the prior issue resolution requests. The processor may identify a root cause for the issue resolution request.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
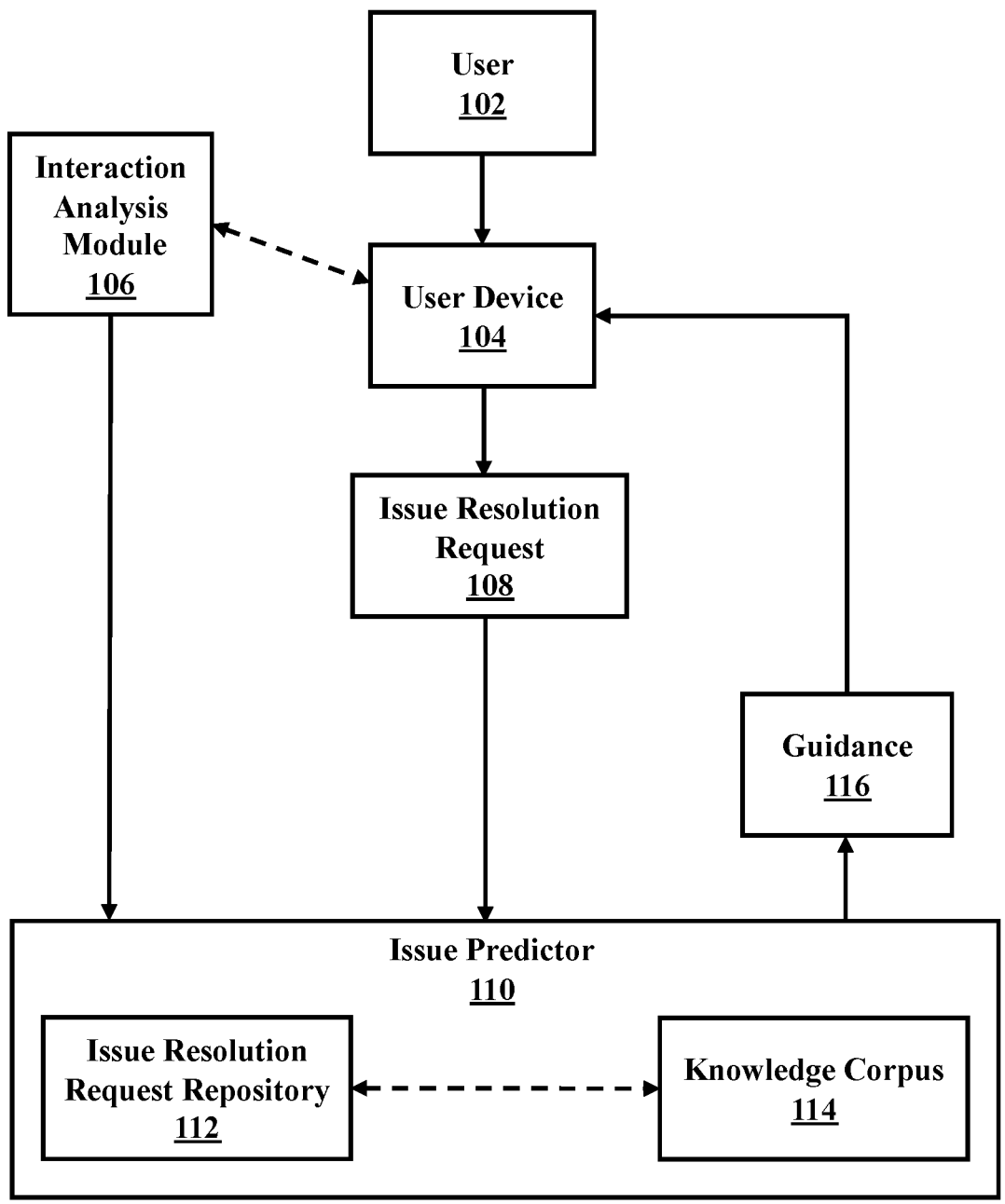
FIG. 1 illustrates a block diagram of an example proactive shift left guidance system, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of application management and support (AMS), and more specifically to providing proactive guidance to users in order to execute a shift left model in software delivery. While the present disclosure is not necessarily limited to such applications, various aspects of the disclosure may be appreciated through a discussion of various examples using this context.

The proposed solution discussed throughout this disclosure is an AI-enabled solution which utilizes the benefit of shift left that can maximize any AMS and software development project. Shift left is a practice intended to find and prevent defects early in the software delivery process. The idea is to improve quality by moving tasks to the left as early as possible in the lifecycle. Shift left testing means testing earlier in the software development process.

Shift left should be a conscious effort to improve IT service delivery and support rather than something designed to save resources (e.g., capital, processing power, etc.) on a piecemeal basis. It is a strategy that is focused on a number of benefits, such as: speedier incident and service request resolution, cost reductions, better use of scarce technical know-how and capabilities, delivering a better end-user/customer experience, etc.

To achieve these benefits however, organizations/entities may need to appreciate that driving shift left change purely to save resources will most likely cause more of a detriment than help. For instance, an IT self-service capability that is designed and delivered purely to save resources will most likely not be used sufficiently to make a real difference to IT support operations or to deliver the expected resource benefits.

As already mentioned, shift left can make a significant difference to IT service management and IT support operations. In particular, in the unit cost (e.g., the cost per ticket/issue resolution request) of dealing with end-user/user/customer issues. For instance, it has been shown that the cost of Level 0 support is less than 10% of Level 1 costs.

For further reference, it has been shown that incident prevention costs $0 USD, Level 0 (self-help) costs around $2 USD, Level 1 (service desk help) costs around $22 USD, desktop support help costs around $69 USD, Level 2 (IT support help) costs around $104 USD, and Level 3 (vendor support help) costs around $599 USD. Thus, the concept of shift left means shifting issue help to the left, e.g., a lower level.

Accordingly, the more tickets/issue resolution requests that can be shifted to the left, the more inexpensive they become to resolve (or provision against). For example, a $22 USD Level 1 "human" password reset versus a $2 USD Level 0 automated password reset.

It is noted that in the traditional software development model, requirements are kept on the left side of the plan, and delivery and testing requirements are on the right side. The problem in such a development model is that these practices cannot handle changing expectations and requirements, which leads to negative outcomes such as increased costs, increased time to market, and unexpected errors. Another issue to arise is that with any large application support account, large amounts of tickets are received on a monthly basis and the application support IT team members/resources are generally a fixed count. Thus, shift left helps the application support organization to manage the support tickets in an optimal manner; some of the tickets can be solved by the business users while creating the ticket, and some tickets might need to be resolved by the Level 3 support team. Accordingly, the solution presented herein provides an appropriate guidance that will be provided to a business user for maximizing the benefit of shifting left.

Before turning to the FIGS. it may be beneficial to discuss the novelties of said solution:

While interacting with any business application by a (business) user, the proposed solution will predict any problem/issue the user might have to face associated with the application, and accordingly the proposed (AI) solution will proactively create/generate an appropriate guidance for the user so that the problem can be solved in a proactive manner by the user without creating/generating any service ticket/issue resolution request that will be forwarded to another level of help;

While creating/generating any service ticket by any user, the proposed solution will analyze the ticket based on the description from the user and/or application behavior and accordingly the proposed solution will identify an appropriate guidance for the user so that the ticket that is being created can be resolved immediately after the creation of the ticket;

If any ticket is created, with the AI nature of the solution, if the created ticket cannot be resolved by the user on their own, then, the proposed solution will analyze the ticket and predict the appropriate stage of service delivery/support level where the ticket can be resolved;

Based on historical data/information/details of creation of previous tickets by different users, the proposed solution will predict if appropriate user training is required so that the creation of the ticket can be reduced, and accordingly the proposed solution will create an appropriate training (e.g., a guidance sequence that is a training sequence) to interact with the applications so that the tickets can be reduced;

The proposed solution will identify if multiple users are creating same/similar types of tickets, or having same/similar problems/issues, and accordingly, the proposed solution will create an appropriate collaborative learning (guidance sequence) so that the identified users can solve the problem/issue together;

The proposed solution will identify a current level of engagement of the user(s), and determine/identify if providing a guidance is appropriate during that time in order to solve the problem/issue (e.g., determine if fixing the issue at a particular time is worth disengaging the user from their current task), and accordingly, the proposed solution will identify appropriate timing when the problem/issue can be solved with appropriate guidance; and/or The proposed solution can be indexed with a type of device (e.g., a service module, etc.) and mode of access for solving the reported issues and also identify the resources needed for it, and accordingly, will be able to switch views, supplement the user with additional material, and/or initiate/invoke a collaborative channel to handshake with Level 3 support.

Referring now to FIG. 1, illustrated is block diagram of an example proactive shift left guidance system 100, in accordance with aspects of the present disclosure. As depicted, the proactive shift left guidance system 100 includes a user 102, a user device 104, an interaction analysis module 106, an issue resolution request 108, an issue predictor 110 that includes an issue resolution request repository 112, a knowledge corpus 114, and a guidance (sequence) 116.

In some embodiments, the user 102 is interacting with an application (not depicted) via the user device 104. In some embodiments, the application may be partnered with the proactive shift left guidance system 100 (e.g., the application is subscribed to the proactive service of the system). The user 102 may begin to experience an issue/problem with the application and reach out for support for this issue via a support link within the application. The user then begins the creation/generation of the issue resolution request 108.

In some embodiments, upon the creation/generation of the issue resolution request 108, the user 102 is automatically asked to opt-in to allowing the interaction analysis module 106 to follow their interactions with the application and/or with their interaction/input associated with the issue resolution request 108. In some embodiments, after opting-in, the user 102 may save their selection and if a subsequent issue arises, the interaction analysis module 106 may automatically begin following interactions.

In some embodiments, the interaction analysis module 106 begins to identify a specific/particular interaction or keyword the user 102 is using (e.g., the user 102 clicks multiple times on a link, the user 102 has included the words "not loading" in their issue resolution request, etc.). Upon identification of the specific/particular interaction and/or keyword, the interaction analysis module 106 begins to communicate with the issue predictor 110.

The issue predictor 110 takes the information from the interaction analysis module 106 and accesses either or both the issue resolution request repository 112 and/or the knowledge corpus 114. As depicted, the issue resolution request repository 112 and the knowledge corpus 114 may interact with one another to find a common Nexus between the interaction/keyword provided by the interaction analysis module 106 and other prior issue resolution requests (e.g., if the user 102 is clicking too fast, they may be causing a loading glitch, which was the case in a prior issue resolution request, etc.). In some embodiments, the prior issue resolution requests may be tagged with indicators or metadata (e.g., loading issue tag, multiple click tag, etc.) that help the issue predictor 110 locate the same or similar issues that the user 102 is experiencing. In some embodiments, the issue resolution request repository 112 may be incorporated with the knowledge corpus 114 (e.g., the knowledge corpus 114 may be housed within the issue resolution request repository 112).

In some embodiments, once the issue predictor 110 identifies a likely root cause for the issue with the application (e.g., as determined by a similarity between the issue resolution request 108/interactions/keywords/etc.) the issue predictor 110 generates the guidance 116 that may be provided to the user 102 via the user device 104. In some embodiments, the guidance 116 may be any of: a guided sequence for the user to try to resolve the issue (e.g., use command "r" to reload the page, then click the link once), a guided list of words to present in the issue resolution request 108 that will help a different level support operator (e.g., indicate that the page has been frozen for 20 mins), an automatic issue resolution request to preload as the issue resolution request 108 (e.g., this requests mirrors exactly issue resolution request #XXYY from the issue resolution request repository 112), etc.

In some embodiments, as depicted, if the user 102 does not opt-in to the interaction analysis module 106 following their interactions, the user 102 can finish the issue resolution request 108 and it can be used by the issue predictor 110 to predict the issue and provide the guidance 116.

Turning to a more in-depth example associated with the proactive shift left guidance system 100, the proactive shift left guidance system 100 will have an AI-module (e.g., processor) to classify tickets (e.g., issue resolution requests) created/generated by different users.

The proactive shift left guidance system 100 will historically track ticket details from a ticket repository (e.g., issue resolution request repository 112), and the ticket detail(s) will be a: ticket description, ticket resolution steps, who created the ticket, when the ticket was/is created, application name associated with the ticket/issue, resolver group (e.g., which level of support), etc.

In some embodiments, based on historically gathered ticket details, the proactive shift left guidance system 100 will classify the tickets, where the classification of the tickets can be based on resolver group, types of solutions applied, etc. Further, based on the ticket details, the proactive shift left guidance system 100 will identify a possible root cause of the tickets; generally root causes are provided while any ticket is resolved.

In some embodiments, based on historical information of different tickets the proactive shift left guidance system 100 will create/generate the knowledge corpus 114 about the tickets. In some embodiments, while interacting with any application by a user, the proactive shift left guidance system 100 will also be analyzing/following/tracking user interaction(s) with the application (using the interaction analysis module 106), and will track when the user is creating any ticket.

Based on historical interactions with the application, and a ticket creation at a later point of time, the proactive shift left guidance system 100 will predict (using the issue predictor 110) if any activity is problematic, and predict a reason for creating the ticket.

The proactive shift left guidance system 100 will create the knowledge corpus 114 about the user 102's interaction behavior with the application which can be an indication that the user 102 is having a problem with the application which has led to the creation of the ticket (e.g., issue resolution request 108). In some embodiments, based on the created knowledge corpus 114, the proactive shift left guidance system 100 will predict what types of problems the user 102 is having and what types of ticket can be created by the user 102.

In some embodiments, based on the knowledge corpus 114, the proactive shift left guidance system 100 will be able to identify types of resolutions (e.g., guidance 116) and resolution steps (e.g., guidance sequences) for any classified ticket.

In some embodiments, while the user 102 is interacting with any application, then the proactive shift left guidance system 100 will identifying/analyze user 102 interaction behavior with the application, and generate an application log associated with the interaction behavior. The proactive shift left guidance system 100 will predict, from the interaction behavior and/or application log, what types of problem the user 102 may be having and what types of tickets can be created based on the interaction behavior and/or application log.

In some embodiments, the identified information from the interaction behavior and/or application log, will be used to predict a possible root cause of the problem, such as if the problem can be resolved with training to the user 102. In such an embodiment, the proactive shift left guidance system 100 will identify appropriate training and provide the training (e.g., guidance 116) to the user 102 to solve the problem.

In some embodiments, if the proactive shift left guidance system 100 predicts any problem(s), then the proactive shift left guidance system 100 will show/provide appropriate guidance (e.g., 116) to the user 102 so that, without creating a ticket, the user 102 can (re)solve the problem.

In some embodiments, the resolution can be provided with an AR/VR device, a text overlay, and/or audio information to the user 102 so that the problem can be resolved without creating a ticket. Based on the guidance 116 to the user 102, the proactive shift left guidance system 100 can understand how the problem can be solved, and the user 102 does not have to create the ticket.

In some embodiments, while creating any ticket, the proactive shift left guidance system 100 will read textual information in the tickets, and according guide the user 102 to show how the problem can be solved. In some embodiments, the proactive shift left guidance system 100 will evaluate if the user 102 can be guided to solve the problem without creating the ticket and if an appropriate guidance (e.g., 116) is not available then the proactive shift left guidance system 100 will automatically and directly assign the ticket to an appropriate group (e.g., support level).

Figure 2A:
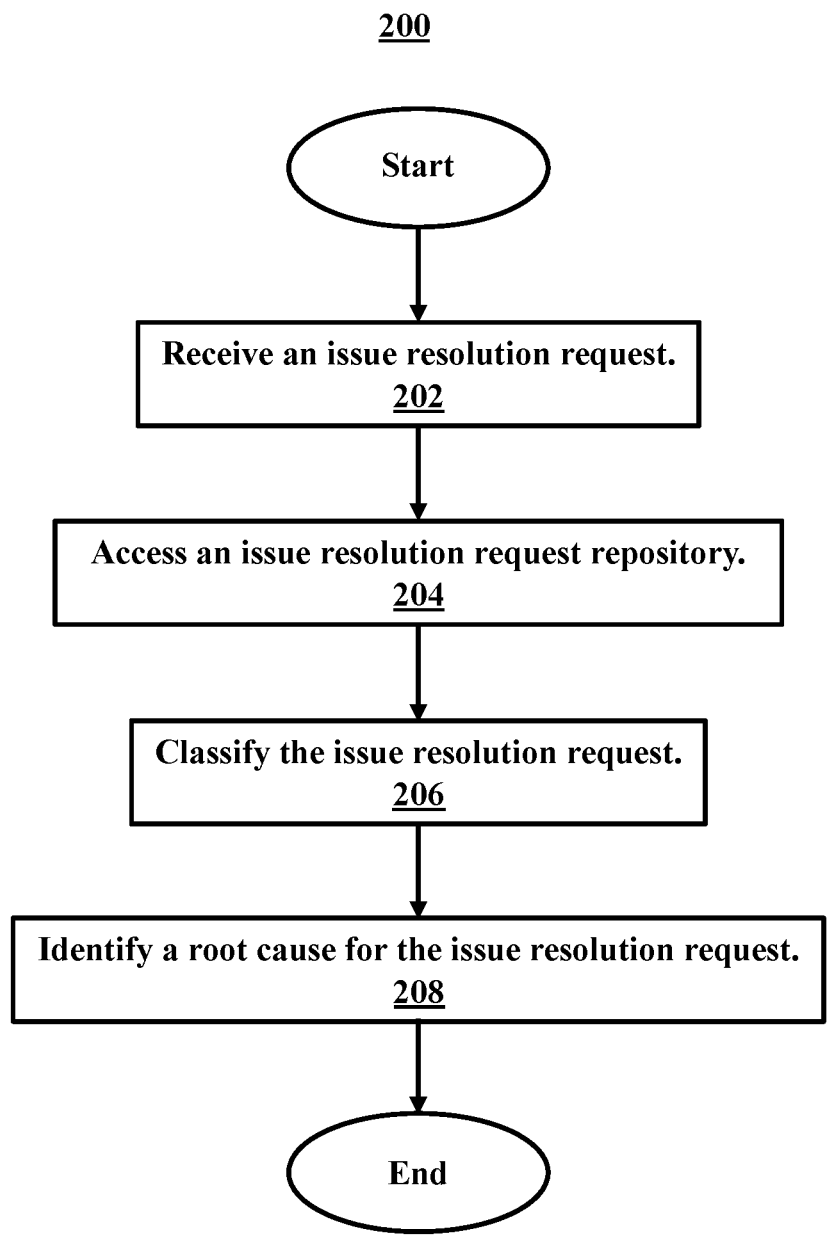
FIG. 2A illustrates a flowchart of a high-level example method for providing proactive guidance to users in order to execute a shift left model in software delivery, in accordance with aspects of the present disclosure.

Referring now to FIG. 2A, illustrated is a flowchart of a high-level example method 200 for providing proactive guidance to users in order to execute a shift left model in software delivery, in accordance with aspects of the present disclosure. In some embodiments, the method 200 may be performed by a processor (e.g., of the proactive shift left guidance system 100, etc.).

In some embodiments, the method 200 begins at operation 202, where the processor receives an issue resolution request (e.g., a ticket). In some embodiments, the method 200 proceeds to operation 204, where the processor accesses an issue resolution request repository. The issue resolution request repository may include details (e.g., tags associated with issues, classification type of the issues, etc.) related to/associated with prior issue resolution requests (e.g., where the prior issue resolution requests could be related to an assortment of other respective users).

In some embodiments, the method 200 proceeds to operation 206, where the processor classifies the issue resolution request based on the details related to the prior issue resolution requests. In some embodiments, the method 200 proceeds to operation 208, where the processor identifies a root cause for the issue resolution request (e.g., the installation of the application was corrupted, the user is using the wrong tool, etc.).

In some embodiments, discussed below, there are one or more operations of the method 200 not depicted for the sake of brevity and which are discussed throughout this disclosure. Accordingly, in some embodiments, the processor may further incorporate the issue resolution request into the issue resolution requests repository and generate a knowledge corpus in the issue resolution request repository. In some embodiments, the knowledge corpus may include predicted connections (e.g., a common Nexus) between the issue resolution request and the prior issue resolution requests (e.g., if classified as X then likely root cause is Y and this X-classified issue could then relate to this other ticket that is having this same X-classified issue, or it is known that issues related to Y-root cause are known to have a Z-classified issue too, etc.).

In some embodiments, the processor may further identify a generation of the issue resolution request and analyze/follow user interactions with an application. The application may be associated with the issue resolution request. The processor may further predict that an issue with the application will occur, based on the classifying of the issue resolution request and the analyzing of user interactions. The processor may generate an indication about the issue and provide the indication to a user (or users depending on the application).

In some embodiments, the indication is a guidance, and the processor further predicts a classification for the issue resolution request. The classification may be associated with a specific issue (e.g., 404 error, lag issues, etc.). The processor may identify a resolution for the specific issue and provide the guidance to the suer to pre-empt the specific issue (e.g., provide training to the user on how to use the application/fix the issue, how to fill in the issue resolution request such that it is filtered to a correct level of support, etc.).

In some embodiments, the processor may further identify that the guidance pre-empted the specific issue and provide the user an opportunity to cancel the generation of the issue resolution request. In some embodiments, if the processor identifies that the guidance pre-empted the specific issue (e.g., prevented the specific issue from occurring or resolved the specific issue) the processor may automatically stop the generation of the issue resolution request.

In some embodiments, the processor may identify that the guidance did not pre-empt the specific issue and provide the user with an addendum (e.g., an add-on, an update, etc.) to the guidance. The addendum may provide concise terms to include in the issue resolution request (which may help filter the issue resolution request to a correct level of support). In some embodiments, the addendum may provide an attrition step or avenue for the user to attempt in order to resolve the specific issue.

Figure 2B:
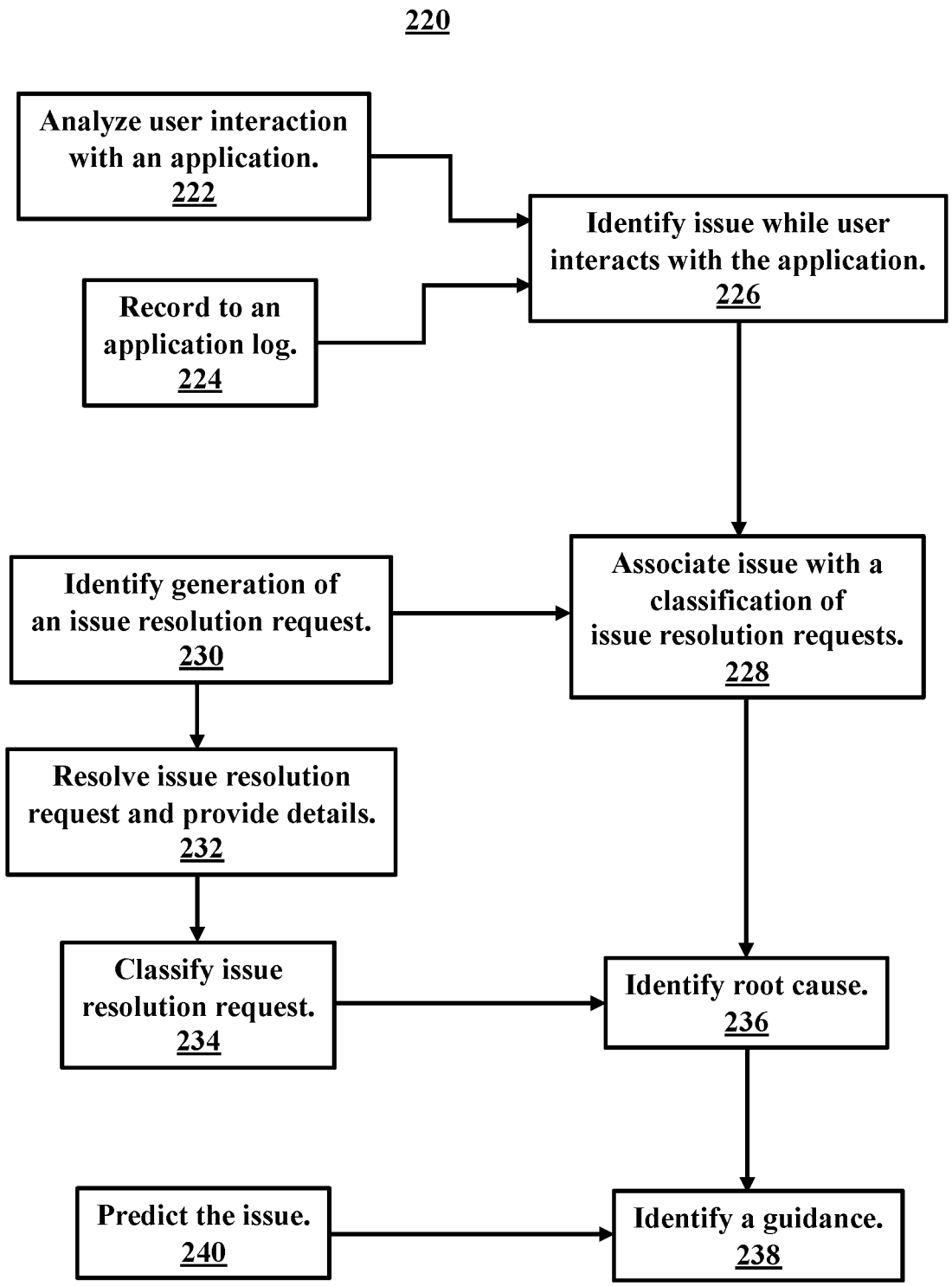
FIG. 2B illustrates a flowchart of a low-level example method for providing proactive guidance to users in order to execute a shift left model in software delivery, in accordance with aspects of the present disclosure.

Turning now to FIG. 2B, illustrated is a flowchart of a low-level example method 220 for providing proactive guidance to users in order to execute a shift left model in software delivery, in accordance with aspects of the present disclosure. As depicted, in some embodiments, the method 220 may have operations 222 and 224 performed by a processor. The processor, at operation 222, may analyze user interaction(s) with an application and at operation 224, the processor may record the user interaction(s) to an application log. The analysis and recordings at respectively at operations 222 and 224 may then be used by the processor to identify, at operation 226, an issue while a user interacts with the application.

In some embodiments, after operation 226, the processor, at operation 228, may associate the issue with a classification of issue resolution requests. In some embodiments, after operation 228, the processor, at operation 236, may identify a root cause associated with the issue (of the issue resolution request). In some embodiments, before the method 220 proceeds to operation 236, the processor may identify, at operation 230, that generation of an issue resolution request has been initiated; this identification could be used in communication with operation 228 to find a correct classification association.

In some embodiments, the processor may resolve, at operation 232, the issue resolution request and provide details (e.g., classifications, metadata, etc.) to a knowledge corpus that could help resolve subsequent issue resolution requests. In some embodiments, the processor, at operation 234, may classify the issue resolution request. In some embodiments, after operation 234 and/or simultaneously with operation 228, the processor may identify, at operation 236, the root cause.

In some embodiments, after operation 236, the processor may identify, at operation 238, a guidance. In some embodiments, in identifying a guidance at operation 238, the processor may predict, at operation 240, the issue associated with the issue resolution request.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
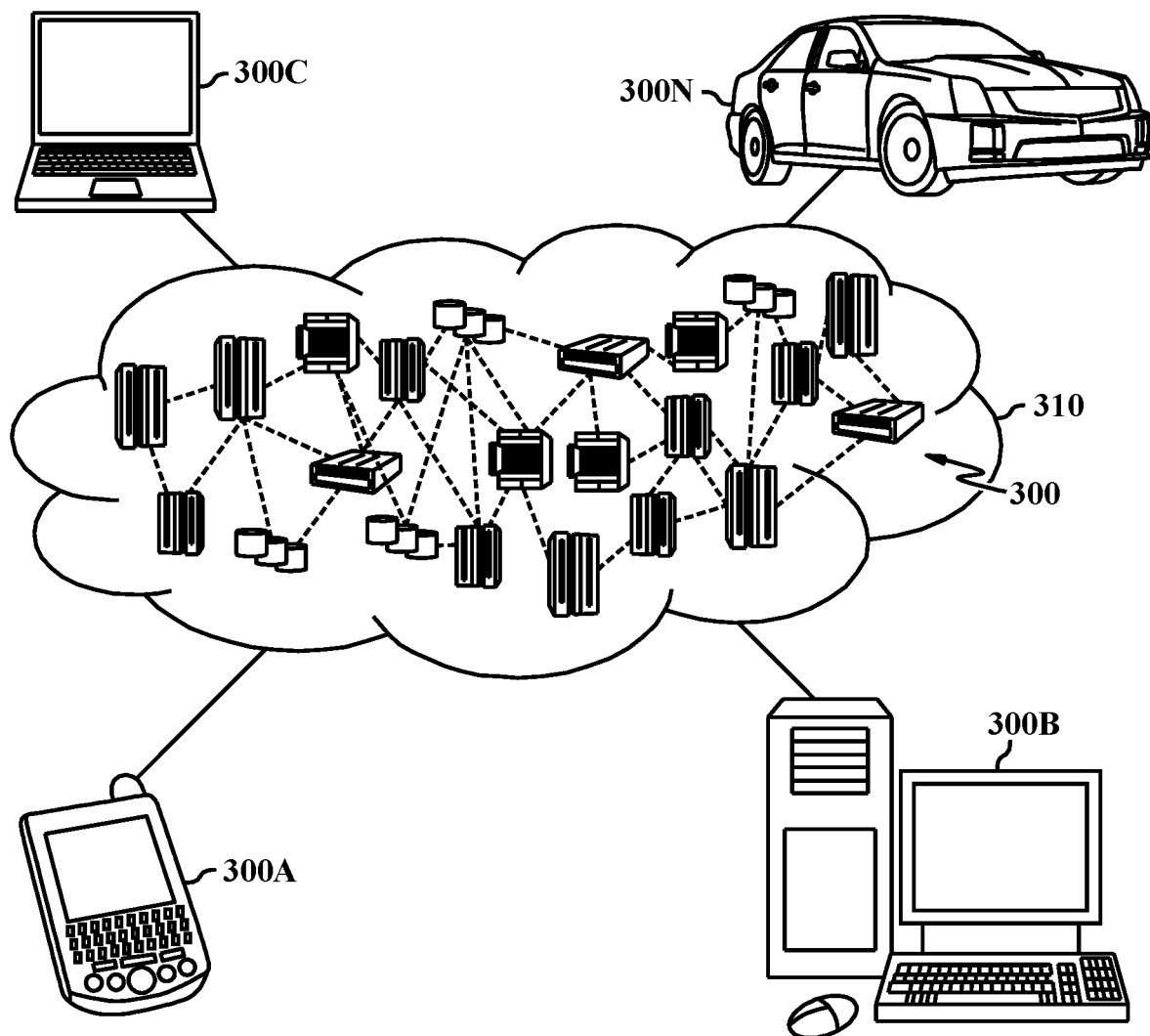
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
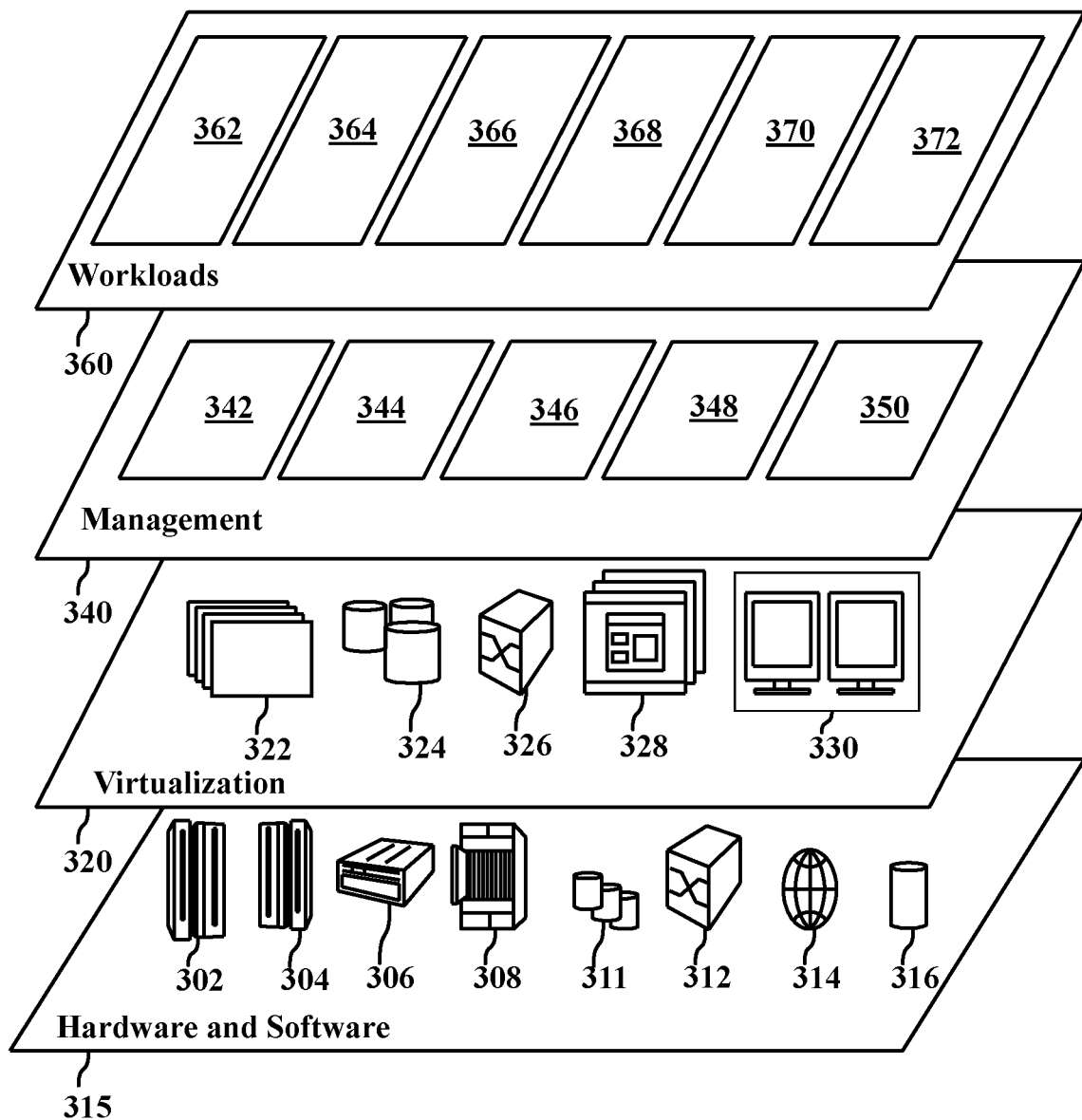
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and providing proactive guidance to users in order to execute a shift left model in software delivery 372.

Figure 4:
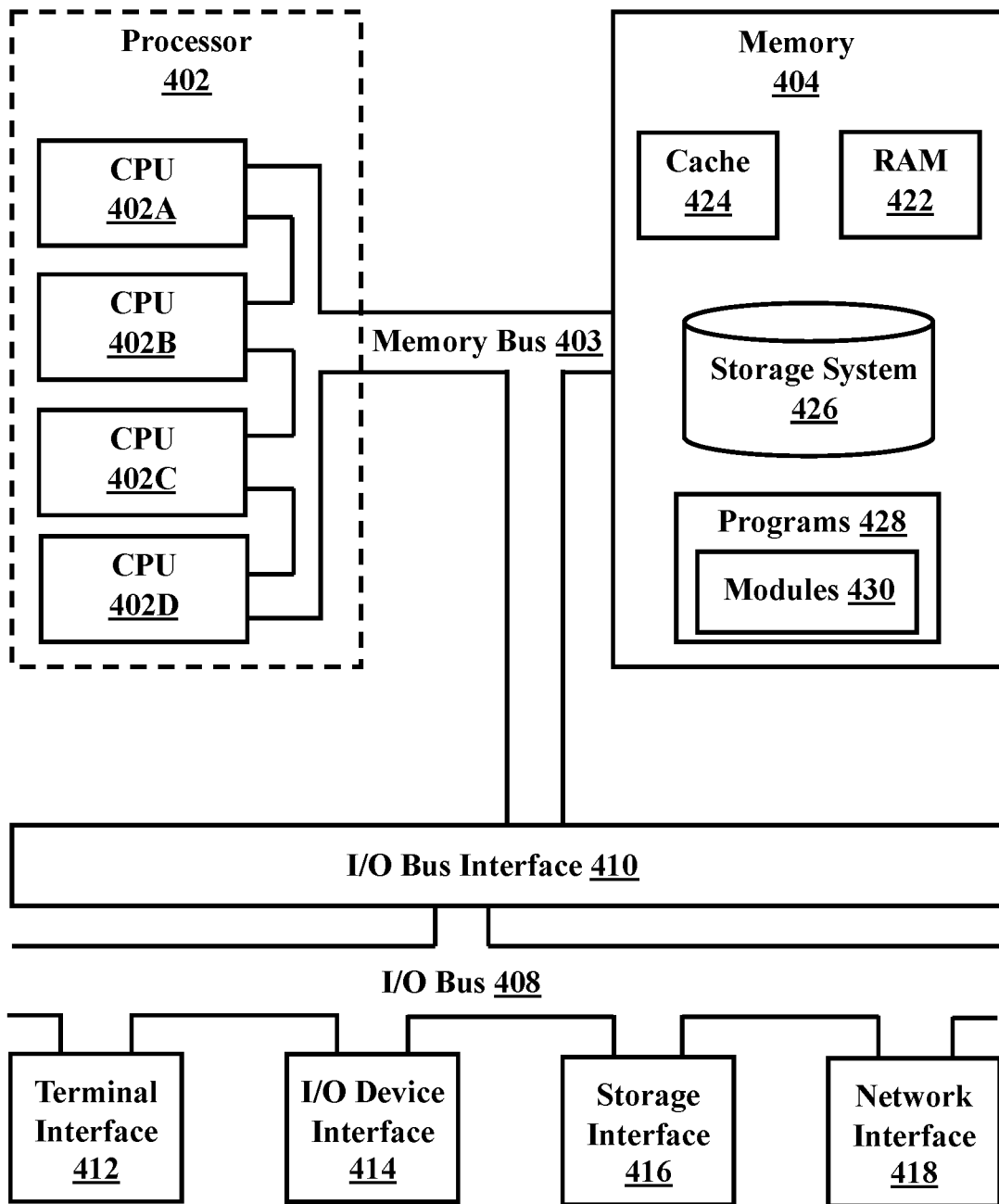
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for providing proactive guidance to users in order to execute a shift left model in software delivery, the system comprising:
   one or more processors, one or more computer-readable memories and one or more computer-readable storage media;
   program instructions, stored on at least one of the one or more storage media for execution by at least one of the one or more processors via at least one of the one or more memories, to receive an issue resolution request;
   program instructions, stored on at least one of the one or more storage media for execution by at least one of the one or more processors via at least one of the one or more memories, to access an issue resolution request repository, wherein the issue resolution request repository includes details related to prior issue resolution requests;
   program instructions, stored on at least one of the one or more storage media for execution by at least one of the one or more processors via at least one of the one or more memories, to classify, based on the details related to the prior issue resolution requests, the issue resolution request;
   program instructions, stored on at least one of the one or more storage media for execution by at least one of the one or more processors via at least one of the one or more memories, to identify a root cause for the issue resolution request;
   program instructions, stored on at least one of the one or more storage media for execution by at least one of the one or more processors via at least one of the one or more memories, to predict an issue associated with the root cause;
   program instructions, stored on at least one of the one or more storage media for execution by at least one of the one or more processors via at least one of the one or more memories, to generate a guidance sequence, wherein the guidance sequence prevents the escalation of the issue resolution request;
   program instructions, stored on at least one of the one or more storage media for execution by at least one of the one or more processors via at least one of the one or more memories, to resolve the issue resolution request with the guidance sequence;
   program instructions, stored on at least one of the one or more storage media for execution by at least one of the one or more processors via at least one of the one or more memories, to incorporate the issue resolution request into the issue resolution request repository; and program instructions, stored on at least one of the one or more storage media for execution by at least one of the one or more processors via at least one of the one or more memories, to generate a knowledge corpus in the issue resolution request repository, wherein the knowledge corpus includes predicted connections between the issue resolution request and the prior issue resolution requests.

2. The system of claim 1, further comprising:

program instructions, stored on at least one of the one or more storage media for execution by at least one of the one or more processors via at least one of the one or more memories, to identify a generation of the issue resolution request; and program instructions, stored on at least one of the one or more storage media for execution by at least one of the one or more processors via at least one of the one or more memories, to analyze user interactions with an application, wherein the application is associated with the issue resolution request.

3. The system of claim 2, further comprising:

program instructions, stored on at least one of the one or more storage media for execution by at least one of the one or more processors via at least one of the one or more memories, to predict, based on the classifying of the issue resolution request and the analyzing of user interactions, that an issue with the application will occur;

program instructions, stored on at least one of the one or more storage media for execution by at least one of the one or more processors via at least one of the one or more memories, to generate an indication about the issue; and program instructions, stored on at least one of the one or more storage media for execution by at least one of the one or more processors via at least one of the one or more memories, to provide the indication to a user.

4. The system of claim 3, wherein the indication is the guidance sequence, and wherein the system further comprises:

program instructions, stored on at least one of the one or more storage media for execution by at least one of the one or more processors via at least one of the one or more memories, to predict a classification for the issue resolution request, wherein the classification is associated with a specific issue;

program instructions, stored on at least one of the one or more storage media for execution by at least one of the one or more processors via at least one of the one or more memories, to identify a resolution for the specific issue; and program instructions, stored on at least one of the one or more storage media for execution by at least one of the one or more processors via at least one of the one or more memories, to provide the guidance to the user to pre-empt the specific issue.

5. The system of claim 4, further comprising:

program instructions, stored on at least one of the one or more storage media for execution by at least one of the one or more processors via at least one of the one or more memories, to identify that the guidance pre-empted the specific issue; and program instructions, stored on at least one of the one or more storage media for execution by at least one of the one or more processors via at least one of the one or more memories, to provide the user an opportunity to cancel the generation of the issue resolution request.

6. The system of claim 4, further comprising:

program instructions, stored on at least one of the one or more storage media for execution by at least one of the one or more processors via at least one of the one or more memories, to identify that the guidance did not pre-empt the specific issue; and program instructions, stored on at least one of the one or more storage media for execution by at least one of the one or more processors via at least one of the one or more memories, to provide the user with an addendum to the guidance, wherein the addendum provides concise terms to include in the issue resolution request.

7. A computer-implemented method for providing proactive guidance to users in order to execute a shift left model in software delivery, the method comprising:

receiving, by a processor, an issue resolution request;

accessing an issue resolution request repository, wherein the issue resolution request repository includes details related to prior issue resolution requests;

classifying, based on the details related to the prior issue resolution requests, the issue resolution request;

identifying a root cause for the issue resolution request;

predicting an issue associated with the root cause;

generating a guidance sequence, wherein the guidance sequence prevents the escalation of the issue resolution request;

resolving the issue resolution request with the guidance sequence;

incorporating the issue resolution request into the issue resolution request repository; and generating a knowledge corpus in the issue resolution request repository, wherein the knowledge corpus includes predicted connections between the issue resolution request and the prior issue resolution requests.

8. The computer-implemented method of claim 7, further comprising:

identifying a generation of the issue resolution request; and analyzing user interactions with an application, wherein the application is associated with the issue resolution request.

9. The computer-implemented method of claim 8, further comprising:

predicting, based on the classifying of the issue resolution request and the analyzing of user interactions, that an issue with the application will occur;

generating an indication about the issue; and providing the indication to a user.

10. The computer-implemented method of claim 9, wherein the indication is the guidance sequence, and wherein the method further comprises:

predicting a classification for the issue resolution request, wherein the classification is associated with a specific issue;

identifying a resolution for the specific issue; and providing the guidance to the user to pre-empt the specific issue.

11. The computer-implemented method of claim 10, further comprising:

identifying that the guidance pre-empted the specific issue; and providing the user an opportunity to cancel the generation of the issue resolution request.

12. The computer-implemented method of claim 10, further comprising:
- identifying that the guidance did not pre-empt the specific issue; and
- providing the user with an addendum to the guidance, wherein the addendum provides concise terms to include in the issue resolution request.

13. A computer program product for providing proactive guidance to users in order to execute a shift left model in software delivery comprising a computer readable storage medium having program instructions embodied therewith, the program instructions executable by a processor to cause the processor to perform operations, the operations comprising:
- receiving an issue resolution request;
- accessing an issue resolution request repository, wherein the issue resolution request repository includes details related to prior issue resolution requests;
- classifying, based on the details related to the prior issue resolution requests, the issue resolution request;
- identifying a root cause for the issue resolution request;
- predicting an issue associated with the root cause;
- generating a guidance sequence, wherein the guidance sequence prevents the escalation of the issue resolution request;
- resolving the issue resolution request with the guidance sequence;
- incorporating the issue resolution request into the issue resolution request repository; and
- generating a knowledge corpus in the issue resolution request repository, wherein the knowledge corpus includes predicted connections between the issue resolution request and the prior issue resolution requests.

14. The computer program product of claim 13, wherein the processor is further configured to perform operations comprising:
- identifying a generation of the issue resolution request; and
- analyzing user interactions with an application, wherein the application is associated with the issue resolution request.

15. The computer program product of claim 14, wherein the processor is further configured to perform operations comprising:
- predicting, based on the classifying of the issue resolution request and the analyzing of user interactions, that an issue with the application will occur;
- generating an indication about the issue; and
- providing the indication to a user.

16. The computer program product of claim 15, wherein the indication is the guidance sequence, and wherein the processor is further configured to perform operations comprising:
- predicting a classification for the issue resolution request, wherein the classification is associated with a specific issue;
- identifying a resolution for the specific issue; and
- providing the guidance to the user to pre-empt the specific issue.

17. The computer program product of claim 16, wherein the processor is further configured to perform operations comprising:
- identifying that the guidance pre-empted the specific issue; and
- providing the user an opportunity to cancel the generation of the issue resolution request.

* * * * *